May 18, 1965 R. M. SHIPLEY, JR 3,183,656
HYDRAULIC TREE SHAKER APPARATUS
Filed Oct. 2, 1962 2 Sheets-Sheet 1
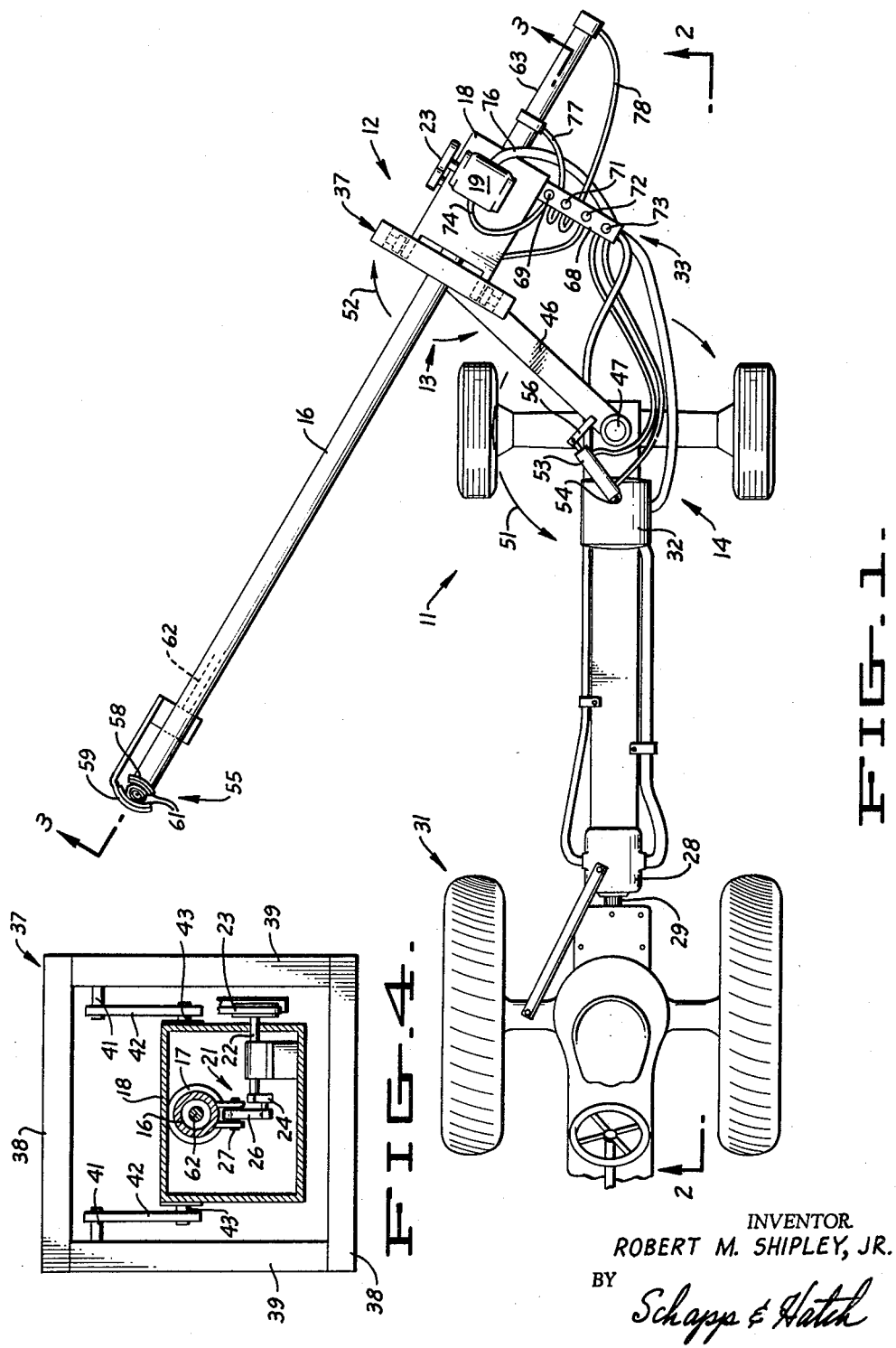
INVENTOR.
ROBERT M. SHIPLEY, JR.
BY
Schapp & Hatch
ATTORNEYS May 18, 1965 R. M. SHIPLEY, JR 3,183,656
HYDRAULIC TREE SHAKER APPARATUS
Filed Oct. 2, 1962 2 Sheets-Sheet 2
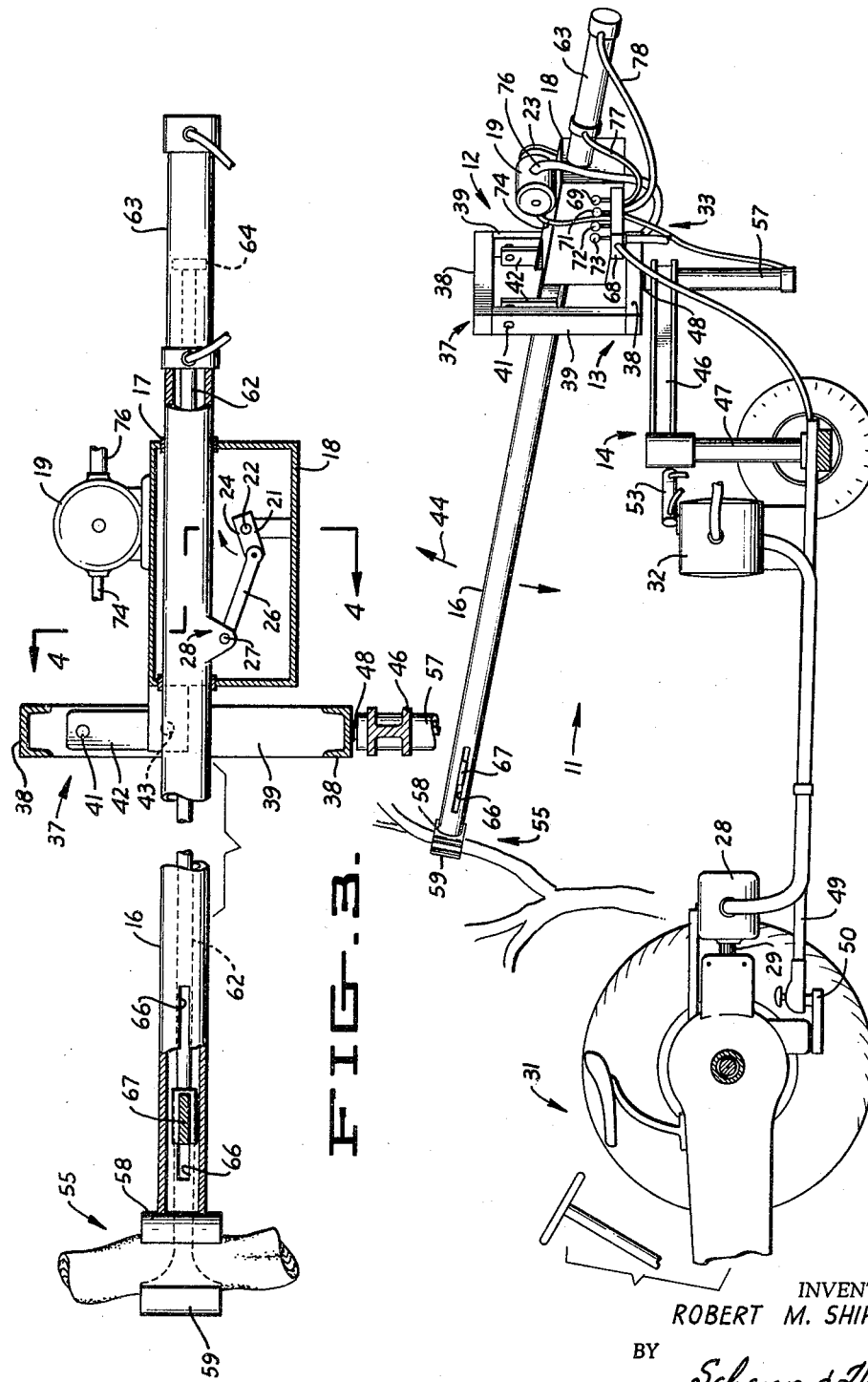
INVENTOR.
ROBERT M. SHIPLEY, JR.
BY
Schapp & Hatch
ATTORNEYS

3,183,656
HYDRAULIC TREE SHAKER APPARATUS
Robert M. Shipley, Jr., Cloverdale, Calif., assignor of
one-half to Norman C. De Laittre
Filed Oct. 2, 1962, Ser. No. 227,894
9 Claims. (Cl. 56—328)

The present invention relates to improvements in a hydraulic tree shaker apparatus and particularly to a tree shaker apparatus suitable for the purpose of gathering fruits or nuts which have ripened on the trees.

It is known to gather ripened fruits or nuts by shaking the tree and gathering the harvest from the ground or a collecting means using one of a number of known methods. In one type of shaker, the trees are shaken by means of a cable or similar device which periodically pulls and releases the trunk or branch to dislodge the fruit from the tree. Another type of shaker utilizes a rigid member or boom which is oscillated so as to force the limbs of the tree back and forth with a reciprocating motion.

A typical example of the latter type of tree shaker is to be found in my copending United States patent application Serial No. 178,394 filed March 8, 1962, entitled Tree Shaker Apparatus, now Patent 3,059,402 and the present application relates to an improvement on the apparatus shown in the patent.

The type of motion which is most satisfactory for dislodging fruits or nuts varies for different trees and is not necessarily the most energetic motion. Accordingly, an optimum period of vibration and an optimum vibrational magnitude is highly desirable for the most efficient removal of each variety of fruit, and these optima can change from tree to tree. Control of these factors is also valuable in assuring minimum injury to the tree. In this connection, shakers which employ a rigid member or boom are generally preferred to those which utilize a rope or a cable because of the improved control of the shaking action.

However, certain of the known machines which utilize rigid members tend to cause injury to the tree. This injury or damage is usually the result of anchoring the boom to a fixed or inordinately heavy support object, which causes excessive jolting of the tree through the application of extreme forces.

Accordingly, it is the primary object of this invention to provide a tree shaking apparatus which utilizes a boom for vibrating the tree and in which the boom is supported in a floating mounting unit whereby the inertia of the floating unit opposes the reactive and resilient forces exerted by the tree in a manner cushioning and controlling the shaking action.

It is also considered desirable to provide an easily controlled energy source to the boom, and it has been found that the use of a hydraulic motor is quite satisfactory. However, certain problems have been encountered when utilizing a hydraulic motor and associated hydraulic equipment for operating an inertial type shaker. For example, the hydraulic motor usually does not provide sufficient mass for inertially opposing the action of the boom which vibrates the tree. However, the required mass may be provided by utilizing a unit for supporting the hydraulic motor and utilizing the unit for inertially opposing the boom. This unit has also been found to be particularly satisfactory for supporting certain hydraulic control elements in a preferred position as will be more fully discussed hereinafter.

It is also desirable to utilize a standard farm tractor or an equivalent vehicle to provide the energy for the hydraulic motor and other hydraulic equipment used. In this connection, it has been found that the self-contained trailer unit disclosed in the application cited above has been particularly adapted for use with a tractor. Most tractors are equipped with a power takeoff as a standard unit and this power take-off may be utilized as a source of energy for the tree shaker simply by providing a hydraulic pump adapted to fit thereon.

Thus it is seen that another primary object of this invention is to provide a tree shaking apparatus which is independently carried on a trailer unit adapted to be used with a standard tractor.

Another important object of the invention is to provide a tree shaking apparatus of the character described which is hydraulically powered through a hydraulic motor and other hydraulic power systems.

A further object of the invention is to provide a hydraulic tree shaking apparatus which is adjustable to provide optimum shaking characteristics for various types and sizes of trees.

A still further object of the invention is the provision of a tree shaking apparatus of the character described in which the boom is supported in a central location thereof so that the operator has improved control over the handling of the boom and the vibrational forces imparted thereto.

Still another object of this invention is to provide a tree shaking apparatus of the character described in which the above-mentioned advantages are obtained with a minimum of structure which may be easily moved from operative position in one tree to operative position in another.

Further objects and advantages of my invention will be apparent as the specification progresses, and the new and useful features of my hydraulic tree shaker apparatus will be fully defined in the claims attached hereto.

The preferred form of my invention is illustrated in the accompanying drawing forming part of this application, in which:

FIGURE 1 is a plan view illustrating a typical tree shaking apparatus constructed according to the invention;

FIGURE 2, an elevational view of the tree shaking apparatus shown in FIGURE 1 in operating position;

FIGURE 3, a sectional view taken along the line 3—3 of FIGURE 1 illustrating in greater detail certain of the parts of the tree shaking apparatus; and FIGURE 4, an enlarged fragmentary view of the tree shaking apparatus of FIGURES 1 through 3 partly in section as seen from line 4—4 of FIGURE 3.

While I have shown only the preferred form of my invention, it should be understood that various changes or modifications may be made within the scope of the claims attached hereto without departing from the spirit of the invention.

Referring to the drawing in greater detail there is shown a tree shaking apparatus 11 comprising an oscillating unit 12, mounting means 13 for holding said oscillating unit, and holding means 14 for supporting said mounting means.

The oscillating unit 12 contains a boom 16 journaled at 17 for free axial movement on a housing 18 of the oscillating unit. Means are also carried on the oscillating unit 12 for reciprocating the boom 16 with respect thereto, said means including a hydraulic motor 19, and a crank 21 having an axle portion 22 journaled for rotation in housing 18 and driven by motor 19 through a drive means 23. The crank 21 also contains a crank arm 24 which has a connecting rod 26 rotatively mounted thereon by means of a ball bearing unit (not shown). The other end of connecting rod 26 is pivotally mounted to the boom 16 at 28 so that rotary motion from the motor is transferred through the crank 21 to effect reciprocating motion of the boom 16.

It is desirable for the operator to be able to adjust the magnitude of the reciprocating motion of the boom and this adjustment is achieved by adjusting the length of the crank arm 24 which is effective in translating the rotary motion from the motor through the connecting rod 26. The specific structure utilized for effecting such an adjustment is described and claimed in my copending application, now Patent 3,059,402, as cited above. The speed of reciprocation may be controlled by the operation of the motor and by using a variable drive means.

An important feature of the invention is the provision of a mounting means which supports the oscillating unit 12 in a floating position, and in which the motor and drive structure is carried on said oscillating unit. With such a structure, the tree is shaken by opposed inertial forces of the oscillating unit. Accordingly, it is desirable to have sufficient weight on the oscillating unit to obtain a high moment of inertia for the unit to provide sufficient shaking, and the housing 18 together with the motor and the drive system are designed to give the desired amount of weight in the unit.

Energy is supplied to the hydraulic motor 19 through a hydraulic system which comprises a pump 28 adapted to fit over a conventional power take-off shaft 29 or the like from a tractor 31, a reservoir 32 for receiving hydraulic fluid from the motor 19 and other units and supplying hydraulic fluid to the pump 28, various hydraulic lines in the system for providing fluid connection between various units, and control means 33 in the hydraulic lines for controlling the operation of various hydraulic units.

In its preferred form, the tree shaker is mounted on a trailer assembly and the hydraulic system is also mounted thereon. In this way, the tree shaker may also be utilized in combination with any standard farm tractor. When the tree shaker is not in use, the tractor is free for other uses. Thus the tractor 31 may be any standard tractor equipped with a power take-off or equivalent means for supplying power to a hydraulic pump 28.

As here shown, the mounting means 13 for holding the oscillating unit 12 comprises a support frame 37 which is in the shape of an open rectangle having a pair of horizontal members 38 and a pair of vertical members 39. Support frame 37 is also mounted for rotation around shaft 48, see FIGURE 3. Pivotally connected through pins 41 and carried on vertical members 39, are a pair of arms 42 which support oscillating unit 12 through pins 43. Pins 41 lie in a common axis and pins 43 lie in a different common axis with the distance between pins 41 and 43 being the same on each arm 42 so as to allow the oscillating unit to swing back and forth in opposition to the reciprocating motion of boom 16.

It is also within the ambit of this invention to utilize other types of floating mountings so that the oscillating unit 12 is free for reciprocating motion. For example, the arms 42 could be replaced with cables or chains and serve a similar function. Alternatively, the oscillating unit 12 could be mounted for axial reciprocating movement on one or more shafts which in turn could be connected to support frame 37. However, if the oscillating unit were mounted on shafts, it would be desirable to include springs or other shock absorbing means at the limit points to protect against unwanted jolting or jarring. Accordingly, the structure illustrated in the drawing is preferred because of the plurality of the functions performed in a simple structure.

Another function achieved by use of the support arms 42 is the ability of the operator to pivot the oscillating unit and accompanying boom through a vertical plane as indicated by arrows 44 in FIGURE 2 so as to provide the desired vertical positioning of the tree gripping means at the end of the boom.

In general, any method for holding support frame 37 would be operative, but I prefer to utilize the holding means 14 illustrated in the drawing. Holding means 14 includes a substantially horizontal arm 46 rotatably mounted on a vertical support 47 and a vertical axle or like member 48 journaled for rotation on horizontal arm 46 and attached to the lower horizontal member 38 of support frame 37 for free rotation of the support frame around a vertical axis. Vertical support 47 is mounted on a trailer unit having a tongue 49 adapted to be attached to hitch 50 of tractor 31 so as to render the device more portable and provide easy transfer from one tree to another.

As best seen in FIGURES 1 and 2, the mounting here shown allows for rigid and accurate positioning of the boom by the operator. For example, the entire unit may be positioned around the circumference of the circle defined by horizontal arm 46 while it is rotated around the vertical support 47 as indicated by arrows 51 in FIGURE 1. The horizontal direction of the boom 16 is that obtained by rotation of support frame 37 and vertical axle 48 in the mounting thereof so as to provide movement in either direction as indicated by arrows 52 of FIGURE 1.

The vertical positioning of the boom is obtained through the adjustment of the inclination of boom 16 by the appropriate pivoting of arms 42. This adjustment also facilitates fastening of the end of the boom on the tree through tree gripping means 55.

In order to assist the operator in rotating the arm 46 around the vertical support 47 to position the tree shaker, a hydraulic cylinder 53 is provided which has one end pivotally attached to trailer unit at 54 and the other end attached to arm 56 which is rigidly connected to the arm 46, see FIGURE 1. With this arrangement, the operator can position the shaker even when the unit rests on uneven ground and the required movement is slightly uphill.

The cylinder is used simply to place a shaker initially in position and after the tree has been gripped the hydraulic cylinder is deactivated so as to allow the arm 46 to float freely. With the arrangement shown, it is possible to move the arm through an angle sufficiently large to provide any desired position. Alternatively, a hydraulic motor could be used instead of the cylinder shown to give complete rotation of the shaker carrying arm 46.

It is also possible to provide the hydraulic arrangement for rotation of the frame 37 around its axle 48, but it is preferred to leave this rotation to manual operation by the operator. Since the unit is balanced on axle 48 no uphill movement is encountered and the operator can easily provide the necessary rotation. In practice, it has been found preferable for the operator to manually position the shaker, and that hydraulic power should only be used when the mass to be moved exceeds the operator's strength.

As indicated above, the vertical positioning in the boom is obtained through the adjustment of the inclination of boom 16 by the operator. However, in some cases, it is desirable to provide for an increase in the amount of vertical positioning obtainable, such as when large trees are to be operated upon. In order to provide this additional vertical positioning, a hydraulic cylinder 57 is added which is capable of adjusting the elevation of support frame 37 with respect to the horizontal arm 46. Alternatively, this cylinder could be placed to raise the vertical support 47 and provide increased elevation of horizontal arm 46. However, it is preferred to place the cylinder where the least weight is to be lifted and in close proximity to the control means 33.

As best seen in FIGURE 3, the tree gripping means includes an abutting plate 58 which is adapted to fit against a tree for the limb to be shaken and a cooperating plate 59 which is drawn against the tree or limb on the side opposite plate 58. In order to protect the tree from injury, the plates 58 and 59 have cushions 61 on the surfaces adapted to grip the tree.

The relative distance between plate 58 and plate 59 is controlled by axial movement of shaft 62. This axial movement is effected through a hydraulic cylinder 63 mounted on the end of boom 16, and this cylinder actuates a piston 64 which is connected to the shaft. Accordingly, it is seen that shaft 62 is journaled for axial movement within boom 16 and this axial motion is used to provide a clamping action on plates 58 and 59. In order to prevent relative rotation between the boom 16 and the shaft 62 and to preserve the proper alignment of the cooperating plates 58 and 59, a slot 66 is provided in the boom 16 and the lug 67 which is integrally connected to the shaft 62 is adapted to slide within said slot.

The use of a long shaft 62 together with the mounting of the hydraulic cylinder at the back of the shaker has a number of advantages over the placement of a hydraulic cylinder near the hook or clamping elements. One of these advantages resides in the fact that the hydraulic cylinder is in close proximity to the hydraulic system and the hoses from the cylinder to the valves are very short.

This arrangement minimizes the amount of "give" in the system, and holds the hook closed much better than is the case where the hose must run from the valve all the way to the end of the boom. In other words, when the hose runs along the length of the boom it gives a long column of fluid that acts as a shock absorber to allow the hook to work open slightly with each stroke of the shaker. On the other hand, the valves cannot be placed near the hook because they must be in a convenient position for control by the operator.

Another advantage of having the cylinder at the rear end of the boom resides in the convenience of this position where servicing is required. In other words, access to the cylinder is provided simply by disassembling the end thereof, and removing the cylinder sleeve so that worn piston seals may be replaced without disassembly of any other parts. On the other hand, in designs where the hydraulic cylinder is mounted within the boom near the hook, it is necessary to disassemble the boom as well as the cylinder to reach damaged seals for replacement thereof.

Another feature of the invention resides in the convenient placement of the control means 33. This control means consists of the valves controlling the hydraulic lines leading to the various hydraulic units. It is, of course, advantageous to provide the valves near the end of the tree shaker where the operator is located, and for certain operations this is necessary. For example, it is required when the operator is holding the boom in position on the tree or limb to be shaken and actuates the valve providing control of the hydraulic cylinder that closes the clamping members.

For this reason, the mounting of the valves on the boom has been tried, but where sufficient shaking takes place to achieve the desired results, it has been found that the valves are soon worn through excessive shaking action of the boom. However, I have found that in my inertial type shaker, sufficient mass is provided by the housing of the opposed inertial portion of the shaker so that the valves may be mounted thereon without undue injury.

Thus it is seen from FIGURES 1 and 2, that the control means are mounted on an arm 68 which is welded to or otherwise made a part of the housing 18. With this arrangement, the valves are always in exactly the same relation to the operator's hands, and he does not have to search for them while operating the machine.

In the arrangement here shown, control means 33 comprises valves 69, 71, 72 and 73; however, the number of valves provided depend upon the number of hydraulic units to be controlled. For example, the hydraulic motor 19 and the hydraulic cylinders 63 are considered basic equipment while the hydraulic cylinders 53 and 57 are considered to be desirable but not of primary importance. Thus valve 69 controls the hydraulic line 74 leading to the motor 19 with line 74 receiving hydraulic fluid under pressure from the hydraulic pump 28. The hydraulic fluid is returned from motor 19 to the reservoir 32 through line 76.

The valve 71 is constructed to direct hydraulic fluid to either the front end or rear end of the hydraulic cylinders 63 with line 77 leading to the rear. The valve also provides communication either to the pump or reservoir so that in one position line 78 receives the hydraulic pressure and line 77 serves as a return line while in another position line 77 receives hydraulic pressure and line 78 serves as a return line. A neutral valve position may also be provided if desired. The valves 72 and 73 are constructed to operate the associated hydraulic cylinders in a manner similar to that in which valve 71 operates cylinder 63 so that the cylinders may be actuated in either direction or left in a substantially neutral position.

From the foregoing description, it is seen that my tree shaking unit can be moved readily into position for shaking a tree or limb and that the operator can handle the boom at the lower end thereof to position it on the tree to be shaken. Similarly, the operator can adjust the length of the crank arm if necessary to provide the optimum degree of shaking without changing his position. Alternatively, the drive ratio between the hydraulic motor 19 and the crank may be varied by using a variable pulley system for drive means 23.

It is also seen that the structure provided carries the oscillating unit and boom journaled therein in a substantially balanced position so as to prevent undue vertical force on the tree while simultaneously providing a floating mount whereby sudden jolts of the tree are positively avoided.

In operation, the tree shaking apparatus is moved about on the trailer unit by means of the tractor 31. When the trailer unit is positioned near a tree, horizontal arm 46 is pivoted horizontally around vertical support 47 to position support frame 37 in a desired location. This positioning is accomplished either by hand or by operation of the valve 73 which actuates hydraulic cylinder 53. Then support frame 37 is manually rotated around shaft 48 so that the boom points in the desired direction toward the tree. The boom is then pivoted on a horizontal axis so as to position abutting plate 58 behind the tree or bough to be gripped for shaking, and the valve 71 is operated to cause cylinder 63 to move shaft 62 and cooperating plate 59 against the tree. In this way, a secure clamping is effected between plates 58 and 59.

With the tree thus gripped, the hydraulic cylinder 53 is taken out of operation, if used, so as to provide a completely floating contact of the shaking apparatus to the tree to be shaken. In the event that the desired tree position to be gripped is too high for the clamping members to reach by the horizontal pivoting of the boom mentioned above, the support frame 37 may be elevated by operation of the hydraulic cylinder 57 through valve 72. In such case, the lift position is retained during the shaking operation subsequently performed.

With the tree properly clamped, the operator may make a preliminary adjustment of crank arm 24 or drive means 23 based on prior experience so as to achieve optimum shaking for the particular tree. With the adjustment thus made, the operator turns on the motor and provides the desired shaking movement to the tree. In the event that the operator believes adjustment of crank arm 24 or drive means 23 should be made, he can shut off the motor, and make the required adjustment. With the crank arm and/or the speed of rotation thereof readjusted, the operator starts the motor again and completes the shaking operation.

After the tree has been shaken, the cylinder 63 is actuated to open the clamping plates and the boom is removed from the tree. The unit is then moved on to the next tree. An experienced operator can make the necessary adjustments rapidly on the present apparatus and shake the trees in such a way that the fruits or nuts are rapidly removed therefrom without undue injury to the trees.

I claim:

1. A self-contained hydraulic tree shaking apparatus mounted on a mobile unit comprising an oscillating unit, a hydraulic motor carried on said oscillating unit, mounting means carried on the mobile for supporting said oscillating unit for free horizontal movement, a boom journaled for axial movement through said oscillating unit, drive means in operative connection with said hydraulic motor for reciprocating the boom with respect to said oscillating unit, clamping means mounted on the boom for gripping a tree to be shaken including a fixed clamping plate and a movable clamping plate, said movable clamping plate being held on a shaft extending over a major portion of the boom and adapted to effect clamping on the tree upon relative axial movement of the shaft and the boom, a hydraulic cylinder mounted on the boom at one end thereof for providing axial movement to said shaft, a pump for supplying hydraulic fluid under pressure to the hydraulic motor and the hydraulic cylinder, a first set of hydraulic lines in communication with said pump and the hydraulic motor, control means in said first set of hydraulic lines for controlling the hydraulic motor, a second set of hydraulic lines in communication with said pump and said hydraulic cylinder, and control means in said second set of hydraulic lines for controlling the operation of the hydraulic cylinder, said control means in said first and second set of hydraulic lines being mounted in close proximity to each other.

2. A self-contained hydraulic tree shaking apparatus mounted on a trailer unit comprising an oscillating unit, a boom journaled for axial movement through said oscillating unit, a hydraulic motor carried on said oscillating unit, drive means in operative connection with said hydraulic motor for reciprocating the boom with respect to said oscillating unit, clamping means mounted on the boom for gripping a tree to be shaken including a fixed clamping plate and a moveable clamping plate, said movable clamping plate being held on a shaft extending over a major portion of the boom and adapted to effect clamping on the tree upon relative axial movement of the shaft and the boom, a first hydraulic cylinder mounted on the boom at one end thereof for providing axial movement to said shaft, mounting means carried on the trailer for supporting said oscillating unit for free horizontal movement, said mounting means containing a vertical support mounted on the trailer, a substantially horizontal support arm mounted on said vertical support for rotation in a substantially horizontal plane, and a substantially vertical support means on said horizontal support arm for holding the oscillating unit against the force of gravity, said vertical support means carrying said oscillating unit through means allowing horizontal rotation around said support means as an axis, a pump for supplying hydraulic fluid under pressure to the hydraulic motor and the hydraulic cylinder, a reservoir for holding hydraulic fluid and supplying same to the pump, a first set of hydraulic lines in communication with said pump and the hydraulic motor, control means in said first set of hydraulic lines for controlling the hydraulic motor, a second set of hydraulic lines in communication with said pump and said hydraulic cylinder, and control means in said second set of hydraulic lines for controlling the operation of the hydraulic cylinder.

3. The hydraulic tree shaking apparatus defined in claim 2, which also comprises a second hydraulic cylinder operatively connected to said horizontal support arm for providing powered rotation thereto and means for controlling the operation of said second hydraulic cylinder.

4. The hydraulic tree shaking apparatus defined in claim 2, which also comprises a third hydraulic cylinder operatively connected to said substantially vertical support means carried on the horizontal support arm, and means for controlling the operation of said third hydraulic cylinder.

5. The hydraulic tree shaking apparatus defined in claim 2, which also comprises a second hydraulic cylinder operatively connected to said horizontal support arm for providing powered rotation thereto, means for controlling the operation of said second hydraulic cylinder, a third hydraulic cylinder operatively connected to said substantially vertical support means carried on the horizontal support arm, and means for controlling the operation of said third hydraulic cylinder.

6. A self-contained hydraulic tree shaking apparatus mounted on a trailer unit comprising an oscillating unit, a boom journaled for axial movement through said oscillating unit, a hydraulic motor carried on said oscillating unit, drive means in operative connection with said hydraulic motor for reciprocating the boom with respect to said oscillating unit, said drive means containing a crank rotated by said motor, a connecting rod pivotally connected to the boom and rotatably connected to the crank on its arm for transferring rotary motion of the motor to reciprocating motion of the boom, and means for adjusting the length of the crank arm, clamping means mounted on the boom for gripping a tree to be shaken including a fixed clamping plate and a movable clamping plate, said movable clamping plate being held on a shaft extending over a major portion of the boom and adapted to effect clamping on the tree upon relative axial movement of the shaft and the boom, a first hydraulic cylinder mounted on the boom at one end thereof for providing axial movement to said shaft, mounting means carried on the trailer for supporting said oscillating unit for free horizontal movement, said mounting means containing a vertical support mounted on the trailer, a substantially horizontal support arm mounted on said vertical support for rotation in a substantially horizontal plane, and a support frame having a pair of arms each pivotally mounted to said support frame at one place on the arm and pivotally mounted to a central portion of said oscillating unit at another place on the arm, a pump for supplying hydraulic fluid under pressure to the hydraulic motor and the hydraulic cylinder, a reservoir for holding hydraulic fluid and supplying same to the pump, a first set of hydraulic lines in communication with said pump and the hydraulic motor, control means in said first set of hydraulic lines for controlling the hydraulic motor, a second set of hydraulic lines in communication with said pump and said hydraulic cylinder, and control means in said second set of hydraulic lines for controlling the operation of the hydraulic cylinder, said control means in said first and second set of hydraulic lines each being mounted on the oscillating unit in close proximity to each other.

7. The hydraulic tree shaking apparatus defined in claim 6, which also comprises a second hydraulic cylinder operatively connected to said horizontal support arm for providing powered rotation thereto and means for controlling the operation of said second hydraulic cylinder.

8. The hydraulic tree shaking apparatus defined in claim 6, which also comprises a third hydraulic cylinder for elevating and lowering said support frame, and means for controlling the operation of said third hydraulic cylinder.

9. The hydraulic tree shaking apparatus defined in claim 6, which also comprises a second hydraulic cylinder operatively connected to said horizontal support arm for providing powered rotation thereto, means for controlling the operation of said second hydraulic cylinder, a third hydraulic cylinder for elevating and lowering said support frame, and means for controlling the operation of said third hydraulic cylinder.

(References on following page)

References Cited by the Examiner

UNITED STATES PATENTS

| | | | |
|---|---|---|---|
| 1,626,068 | 4/27 | Bartlett | 56—328 |
| 2,690,639 | 10/54 | Goodwin | 56—328 |
| 3,059,402 | 10/62 | Shipley | 56—328 |
| 3,077,721 | 2/63 | Balsbaugh | 56—328 |
| 3,121,304 | 2/64 | Herbst | 56—328 |

T. GRAHAM CRAVER, *Primary Examiner.*

RUSSELL R. KINSEY, *Examiner.*